May 16, 1933.  J. A. CROWELL  1,909,523
SYSTEM OF SOFT MUD BRICK MANUFACTURE AND MOLD THEREFOR
Filed April 20, 1931
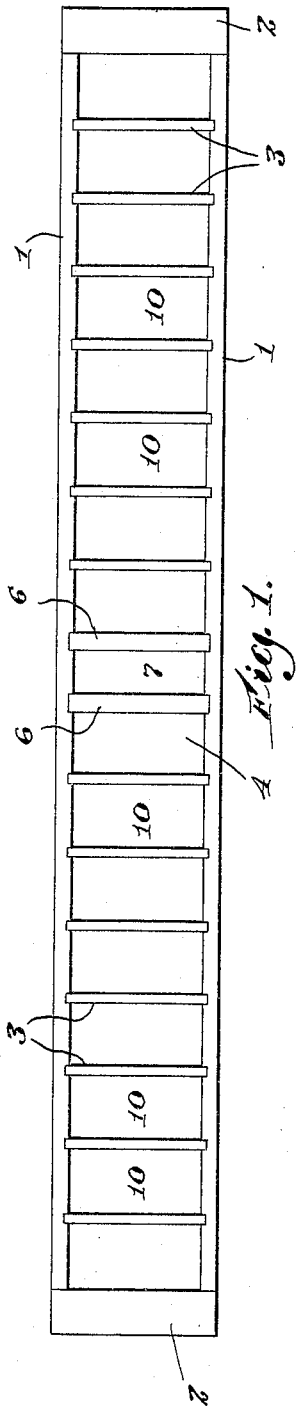
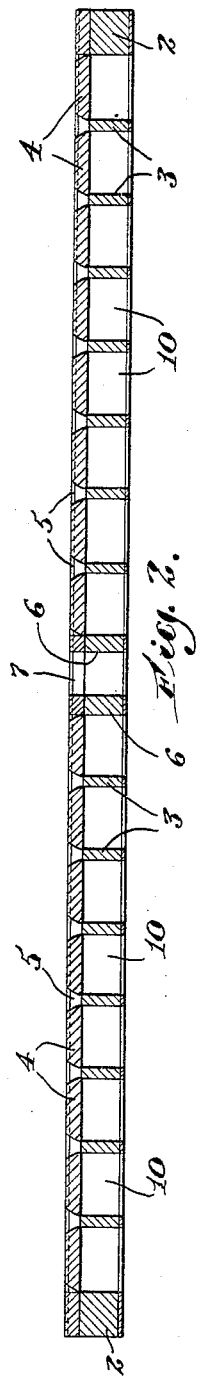
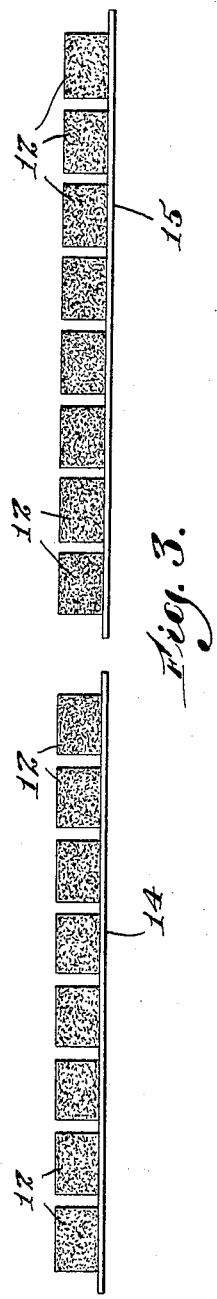
Inventor
J. Addison Crowell
by James R. Hodds
Attorney Patented May 16, 1933

1,909,523

UNITED STATES PATENT OFFICE

J. ADDISON CROWELL, OF WALLKILL, NEW YORK, ASSIGNOR TO JAMES B. CROWELL & SON, OF WALLKILL, NEW YORK, A CORPORATION OF NEW YORK

SYSTEM OF SOFT MUD BRICK MANUFACTURE AND MOLD THEREFOR

Application filed April 20, 1931. Serial No. 531,328.

I accomplish this desirable result by providing a mold sufficient in length for sixteen brick but with a dividing space, recess, or opening approximately central, whereby two pallets, one for each of the eight brick mold at each side of the center, can be utilized. It is also within the scope of the invention to divide any brick mold unevenly, if desired, with nine on one side and seven on the other. Also each pallet could contain different types of brick; it being also possible to provide such a brick mold with one shape, size, or design on one side, and a different one on the other side of the center, thus producing double sets of eight brick each with each cycle of the machine, and each of said sets of brick being of different size, style, contour, or other characteristics.

Referring to the drawing, illustrating a preferred embodiment of the invention,

Fig. 1 is a plan view of my novel mold adapted to carry out the present improved process;

Fig. 2 is a longitudinal sectional view of the mold, showing the same in inverted position during the mold dumping operation, and Fig. 3 illustrates the brick as dumped from my novel mold onto two standard pallets of eight brick capacity.

My present invention is a novel and improved system of making brick, and a novel and improved mold therefor.

In the maufacture of brick by the soft mud process, it is the present tendency to make the present brick machines of larger and greater capacity, but the same have been usually limited by the size and capacity of the pallets on which the molds are dumped, as well as the necessity of handling the pallets in dryers, conveyors, etc.

My present invention enables the capacity of the brick machine to be made with a hundred percent increase in output in the same time, cycle of movements, and with but a slight increase in power, while utilizing the present standard form of pallets. It is at present customary in the soft mud brick industry, particularly in the so-called automatic brick machines, where the molds are handled on conveyors, to make brick utilizing a brick mold with a capacity of from six to nine. But where it is desired to increase this number, the weight, size, and length of the pallets on which the molds are dumped have to be increased to such an extent that the added output of the brick machine is offset by the difficulty in handling the pallets, as well as the expense connected therewith.

My present invention utilizes the present standard form of pallet with a capacity to receive eight brick—which is now the usual output of the automatic brick machine with each mold. By my invention, I am enabled to provide a mold with sixteen brick capacity and thereby double the output of the standard eight brick mold machine and utilize the standard eight brick mold pallet.

In carrying out my present process, I utilize a brick making machine for use in the soft mud industry, wherein a brick press is employed, and the molds are fed under the press, the plastic clay material being forced into the mold cavities by a plunger and press. Then the mold is carried out and the clay struck off, and a succeeding mold moved in under the press. A brick mold is then carried around by chains, or otherwise, to an inverted position to dump the mold on the iron pallets, which have been previously placed on top of the open end portion of the mold.

In my present invention I can, if desired, utilize the slot vent feature of my prior Patent No. 1,756,146, issued April 29, 1930, and the end slot feature of my prior application No. 484,567.

In carrying out the present invention, I make a brick mold of any suitable desired materials, as clearly shown in the drawing, having sides 1, ends 2, and a series of mold partitions 3, 3. Panels or bottoms 4 close the base of the mold, and with the usual base 5, 5 beneath each partition, or with my improved slot vents, as shown in the above mentioned patent. Centrally of the mold with eight brick cavities on each side of same, I provide two relatively heavy partitions 6, 6, having an open space 7, especially so that when the mold is in uppermost and clay-receiving position, the space 7 will be free and clear for any mass of clay material to be forced therethrough, thus leaving the brick cavities 10, 10 to receive the plastic clay material constituting the brick 12, 12. After the mold is filled, the iron pallets 14 and 15, of suitable length to receive eight brick each, are placed on top with their respective abutting ends separated slightly over the opening space 7.

The brick pallets and mold are then fed into inverted position, where the molds are lifted therefrom, and the brick remain on the pallets, by any desirable or suitable mold dumping apparatus or method.

It will thus be seen that my invention utilizes a machine of large capacity, a novel mold structure, and the improved process which enables the present brick pallet, of standard capacity for eight brick, to be employed, while permitting a double output from the brick machine.

The advantage of having the pallets of no greater length and width than that suitable for an eight brick machine is of great importance. The weight of the pallets is very material and substantial. As they are relatively thin metal, they are constantly warping and getting out of shape, and with increased length, increased distortion is present, making them more difficult to handle and particularly unsuitable for automatic machine work. The expense of longer pallets is also a serious objection. But one of the principal objections is that most soft mud brick plants are equipped with dryers, dryer shelves, conveyors, etc., to receive an eight brick pallet at its utmost capacity, and the entire plant would have to be rebuilt for a longer pallet, which longer pallet would also be liable to be heavy and distorted, warped, and twisted as to present constant difficulty in operation on the conveyors, even to the extent of being impractical, if not impossible, for commercial use.

While I have illustrated or shown a space or opening as the preferable dividing means between the two series of brick, which would ordinarily be centrally positioned, yet this division could be arranged for unequal series of brick molds adjacent each end, as already pointed out, and the dividing feature could be solid or otherwise.

Furthermore, a broad partition could be employed, adapted to span the adjacent abutting ends of the two brick molds, the important feature being that I can with one mold and at one operation make a large number of brick, utilizing two of the present standard pallets on which to dump said brick. These features I wish to claim herein broadly.

I claim:

An improved brick mold having a plurality of clay receiving cavities toward one end, another series of clay receiving cavities toward the other end, and a space of substantial width dividing the series and permitting the free passage of surplus material therethrough.

In testimony whereof, I have signed my name to this specification.

J. ADDISON CROWELL.